US010346082B2

(12) United States Patent
Jin et al.

(10) Patent No.: US 10,346,082 B2
(45) Date of Patent: Jul. 9, 2019

(54) COMPUTER SYSTEM AND STORAGE CONTROL METHOD

(71) Applicant: HITACHI, LTD., Tokyo (JP)

(72) Inventors: Azusa Jin, Tokyo (JP); Hideo Saito, Tokyo (JP); Shunji Kawamura, Tokyo (JP); Kenji Muraoka, Tokyo (JP); Kunihiko Nashimoto, Tokyo (JP)

(73) Assignee: HITACHI LTD., Tokyo (JP)

( * ) Notice: Subject to any disclaimer, the term of this patent is extended or adjusted under 35 U.S.C. 154(b) by 0 days.

(21) Appl. No.: 15/553,440

(22) PCT Filed: Jun. 24, 2015

(86) PCT No.: PCT/JP2015/068151
§ 371 (c)(1),
(2) Date: Aug. 24, 2017

(87) PCT Pub. No.: WO2016/207995
PCT Pub. Date: Dec. 29, 2016

(65) Prior Publication Data
US 2018/0046404 A1  Feb. 15, 2018

(51) Int. Cl.
G06F 12/00 (2006.01)
G06F 13/00 (2006.01)
(Continued)

(52) U.S. Cl.
CPC .......... *G06F 3/0647* (2013.01); *G06F 3/061* (2013.01); *G06F 3/067* (2013.01); *G06F 3/0617* (2013.01);
(Continued)

(58) Field of Classification Search
CPC ..... G06F 3/0647; G06F 9/4856; G06F 9/5077
(Continued)

(56) References Cited

U.S. PATENT DOCUMENTS 6,684,209 B1   1/2004  Ito et al.
2003/0014600 A1  1/2003  Ito et al.
(Continued)

FOREIGN PATENT DOCUMENTS

JP   2001-265655 A   9/2001
JP   2003-030053 A   1/2003
(Continued)

OTHER PUBLICATIONS

International Search Report for WO 2016/207995 A1, dated Sep. 15, 2015.

*Primary Examiner* — Edward J Dudek, Jr.
*Assistant Examiner* — Sidney Li
(74) *Attorney, Agent, or Firm* — Volpe and Koenig, P.C.

(57) ABSTRACT

A storage system manages control information, which is information related to responses corresponding to prescribed types of commands, for each of a plurality of logical units associated with a logical device, said logical units being provided to one or more host systems. The prescribed types of commands indicating the logical units provided to a first host system, which is one of the one or more host systems, are received from the first host system by the storage system. Responses based on the control information corresponding to the logical units indicated by the received prescribed types of commands are returned to the first host system by the storage system as responses to the received prescribed types of commands.

6 Claims, 14 Drawing Sheets

(51) Int. Cl.
*G06F 13/28* (2006.01)
*G06F 3/06* (2006.01)
G06F 9/48 (2006.01)
G06F 9/50 (2006.01)

(52) U.S. Cl.
CPC .......... *G06F 3/0659* (2013.01); *G06F 9/4856* (2013.01); *G06F 9/5077* (2013.01)

(58) Field of Classification Search
USPC ........................................................ 711/165
See application file for complete search history.

(56) References Cited

U.S. PATENT DOCUMENTS

| | | |
|---|---|---|
| 2005/0228946 A1 | 10/2005 | Gotoh et al. |
| 2009/0235031 A1* | 9/2009 | Gregg .................. G06F 3/0607 711/141 |
| 2010/0199053 A1* | 8/2010 | Otani .................... G06F 3/0605 711/162 |
| 2012/0036330 A1 | 2/2012 | Saito et al. |
| 2013/0007395 A1 | 1/2013 | Tanaka et al. |

FOREIGN PATENT DOCUMENTS

| | | |
|---|---|---|
| JP | 2005-301638 A | 10/2005 |
| JP | 2006-092562 A | 4/2006 |
| JP | 2014-502768 A | 2/2014 |

\* cited by examiner

LU management table
211

| LU ID (LUN) | LDEV ID | Inquiry information |
|---|---|---|
| 1 | 10 | SN:9999, CompanyA, ... |
| 2 | 10 | SN:1111, CompanyH, ... |
| 3 | 20 | unknown |
| 4 | 30 | SN:3333, CompanyH, ... |

FIG. 8

LDEV management table
212

| LDEV ID | RG ID | PDEV ID |
|---|---|---|
| 10 | 100 | External Device |
| 20 | 200 | 7,8,9,10 |
| 30 | 300 | 11,12,13,14 |
| 40 | 400 | 15,16,17,18,19,20 |

FIG. 9

External coupling management table
<u>213</u>

| RG ID | External storage apparatus ID | External LU ID |
|---|---|---|
| 100 | SN 9999 | 9 |
| 200 | - | - |
| 300 | - | - |
| 400 | - | - |

LU management table
211'

| LU ID (LUN) | LDEV ID | Inquiry Information | Reserve Information |
|---|---|---|---|
| 1 | 10 | SN:9999, CompanyA, ... | Host1 |
| 2 | 10 | SN:1111, CompanyH, ... | Host2 |
| 3 | 20 | unknown | .... |
| 4 | 30 | SN:3333, CompanyH, ... | .... |

701 / 702 / 703 / 704

COMPUTER SYSTEM AND STORAGE CONTROL METHOD

TECHNICAL FIELD

The present invention generally relates to storage control.

BACKGROUND ART

In recent years, in a computer system which deals with a large scale of data, data is stored in a large-capacity storage apparatus provided separately from a host computer.

In the case where a storage apparatus within a computer system which is required to operate 24 hours a day, every day is migrated to (replaced with) a new storage apparatus, it is desirable that I/O is not stopped; that is, data exchange between the host computer and the storage apparatus is not stopped.

Further, in migration of the storage apparatuses, it is desirable that an existing apparatus such as a host computer, a migration source storage apparatus and a network apparatus does not need to have a special function. For example, concerning migration of the storage apparatus, it is desirable that an alternate path program of the host computer is a program (function) provided by an operating system of the host computer, that a function of the migration source storage apparatus complies with SCSI (Small Computer System Interface) standards, and that a function of the network apparatus complies with FC (Fibre Channel) standards.

For example, PTL 1 discloses the following computer system. That is, the computer system includes a host computer, a first storage apparatus having a first storage device and a second storage apparatus having a second storage device. The first storage apparatus provides a storage area of the first storage device to the host computer as a first logical unit. The second storage apparatus virtualizes the first logical unit and provides the virtualized first logical unit to the host computer as a second logical unit, collects configuration information of the first logical unit and configures the collected configuration information at the corresponding second logical unit. The host computer adds a path to the second logical unit and deletes a path to the first logical unit. The second storage apparatus copies data stored in the first logical unit to a storage area provided by the second storage device and associates the storage area with the second logical unit.

CITATION LIST

Patent Literature

[PTL 1] US 2012/0036330 (A1)

SUMMARY OF INVENTION

Technical Problem

By utilizing a technique of PTL 1, it is possible to finish migration (for example, replacement) from a first storage apparatus to a second storage apparatus while avoiding stop of data exchange. However, after that, the second storage apparatus (migration destination) continues to simulate configuration information of the first storage apparatus (migration source). Specifically, for example, even if the second storage apparatus receives an Inquiry command in which a second logical unit is designated from the host computer, the second storage apparatus returns an Inquiry response including configuration information (for example, apparatus product number, model name and vendor name) of the first storage apparatus having a first logical unit which is a copy source of the second logical unit. A host computer which changes processing according to at least part of the configuration information (for example, at least one of the vendor name and the model name) of the storage apparatus to be recognized is known. It is desirable that, to such a host computer, the second storage apparatus returns configuration information of the second storage apparatus itself instead of returning configuration information of the first storage apparatus as the own configuration information. However, this will cause necessity to stop data exchange to the host computer, because the host computer recognizes the second logical unit as a new device, and it becomes necessary to reboot the host computer. It is preferable that a period while data exchange is stopped is short, and, it is more preferable that data exchange is not stopped.

This type of problem can occur not only in migration of storage apparatuses, but in other types of environments. For example, as a SCSI command for realizing exclusive control, a Persistent Reservation command is known. The Persistent Reservation command is an example of a reserve command which is a command for acquiring or maintaining ownership of the designated device. Specifically, for example, it is assumed that the first logical unit provided by the first storage apparatus and the second logical unit provided by the second storage apparatus are associated with the same logical device. It is assumed that the first logical unit is provided to the first host computer by the first storage apparatus. It is assumed that the second logical unit is provided to the second host computer by the second storage apparatus. In such an environment, it is assumed that, by the first host computer issuing a reserve command in which the first logical unit is designated to the first storage apparatus, the logical device associated with the first logical unit is reserved. In this case, the second storage apparatus returns a failure response (response meaning that reserve is failed) to the second host computer even if the second storage apparatus receives a reserve command in which the second logical unit is designated from the second host computer.

Solution to Problem

A plurality of logical units associated with a logical device are targets to be provided to one or more host systems, and a storage system manages control information which is information relating to a response to a prescribed type of command for each logical unit. The storage system receives a prescribed type of command in which a logical unit provided to a first host system is designated from the first host system which is one of the one or more host systems. The storage system returns a response based on control information corresponding to the logical unit designated in the received prescribed type of command to the first host system as a response to the received prescribed type of command.

Advantageous Effects of Invention

It is possible to return an appropriate response to a host system which is a transmission source of a prescribed type of command.

BRIEF DESCRIPTION OF DRAWINGS

FIG. 7 illustrates an example of an LU (logical unit) management table.

FIG. 8 illustrates an example of an LDEV (logical device) management table.

FIG. 9 illustrates an example of an externally coupled storage management table.

FIG. 15 illustrates an example of an LU management table according to Embodiment 4.

DESCRIPTION OF EMBODIMENTS

Figure 1:
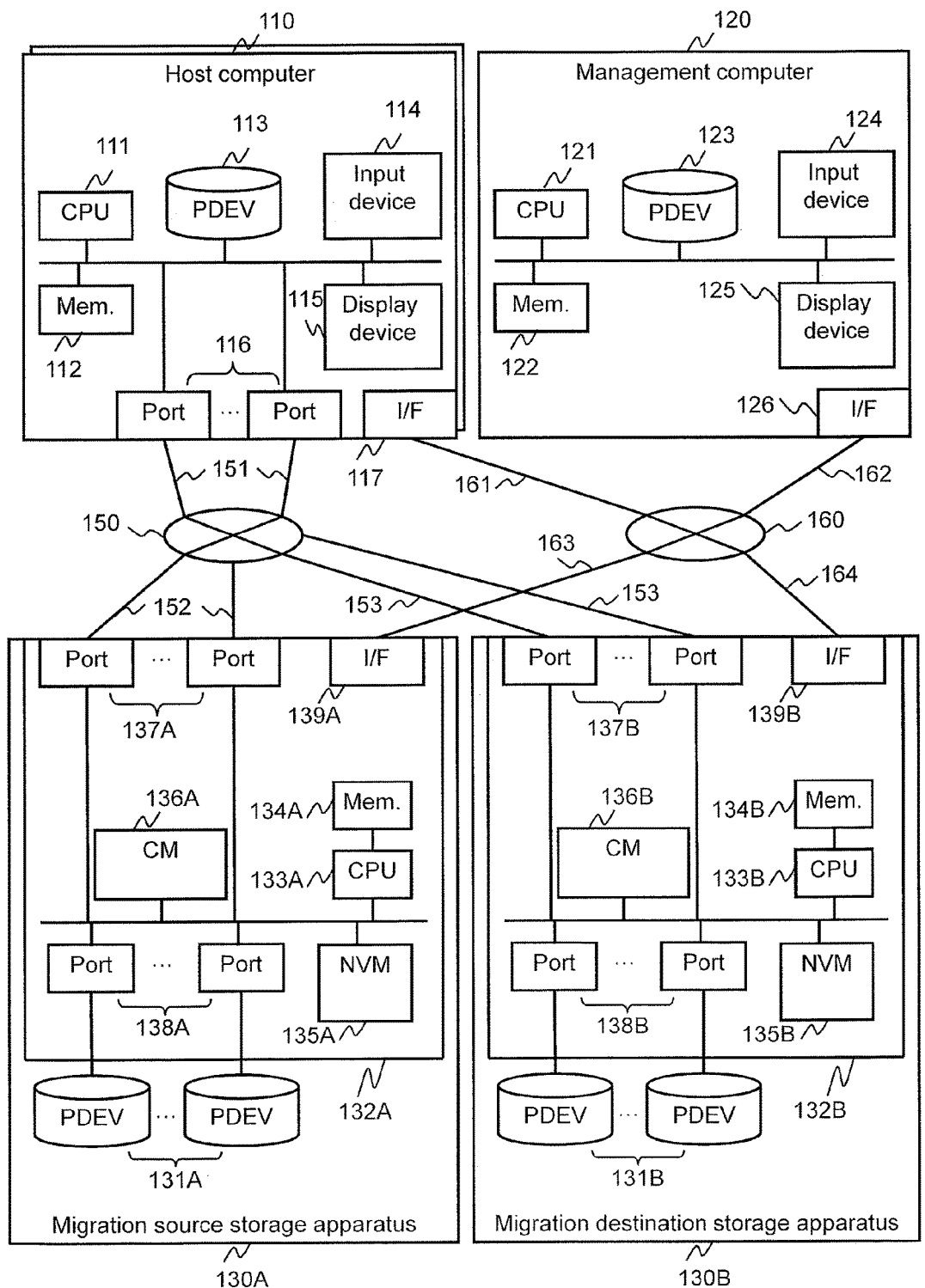
FIG. 1 illustrates a configuration example of a computer system according to Embodiment 1.

Some embodiments will be described below with reference to the drawings.

While, in the following description, information will be described using expression of an "abc table", the information may be expressed using a data configuration other than a table. In order to indicate that the information does not depend on the data configuration, at least one piece of the "abc table" can be referred to as "abc information". Further, in the following description, a configuration of each table is an example, and one table may be divided into two or more tables, or all or part of two or more tables may be one table.

Further, in the following description, an ID of a component refers to identification information (for example, an identifier) of the component, and the identification information can be expressed with a character, a number, a symbol or combination thereof, or the like (for example, name).

Further, in the following description, there is a case where, in the case where the same type of components is described without distinction, a common sign (or a reference numeral) in a reference numeral is used, and, in the case where the same type of components is described distinctively, reference numerals (or IDs of the components) are used.

Further, in the following description, a "storage unit" may be one or more storage devices including a memory. For example, the storage unit may be at least a main storage device among a main storage device (typically, a volatile memory) and an auxiliary storage device (typically, a non-volatile storage device). Further, the storage unit may include at least one of a cache area (for example, a cache memory or an area of part of the cache memory) and a buffer area (for example, a buffer memory or an area of part of the buffer memory).

Further, in the following description, "PDEV" means a physical storage device, and, typically, may be a non-volatile storage device (for example, an auxiliary storage device). The PDEV may be, for example, an HDD (Hard Disk Drive) or an SSD (Solid State Drive).

Further, in the following description, "RAID" is an abbreviation for Redundant Array of Independent (or Inexpensive) Disks. A RAID group is configured with a plurality of PDEVs, and data is stored according to a RAID level associated with the RAID group. The RAID group may be also referred to as a parity group. The parity group may be, for example, a RAID group which stores parity.

Further, in the following description, while there is a case where processing is described using a "program" as a subject, because the program performs determined processing using a storage unit (for example, a memory) and/or an interface device (for example, a communication port), or the like, as appropriate by being executed by a processor (for example, a CPU (Central Processing Unit)), the subject of the processing may be a processor. Processing described using a program as a subject may be processing performed by a processor or an apparatus or a system having the processor. Further, the processor may include a hardware circuit which performs part or all of the processing. The program may be installed in an apparatus like a computer from a program source. The program source may be, for example, a program distribution server or a storage medium which can be read by the computer. In the case where the program source is a program distribution server, the program distribution server includes a processor (for example, a CPU) and a storage unit, and the storage unit may further store a distribution program and a program to be distributed. The processor of the program distribution server may distribute a program to be distributed to other computers by the processor of the program distribution server executing the distribution program. Still further, in the following description, two or more programs may be implemented as one program, or one program may be implemented as two or more programs.

Further, in the following description, a "host system" is a system which transmits an I/O request to a storage system, and may include an interface device, a storage unit (for example, a memory) and a processor coupled to the interface device and the storage unit. The host system may be configured with one or more host computers. At least one host computer may be a physical computer, and the host system may include a virtual host computer in addition to a physical host computer.

Further, in the following description, a "storage system" may be one or more storage apparatuses, and may have a plurality of PDEVs (for example, one or more RAID groups) and a storage controller which controls I/O with respect to the plurality of PDEVs. The storage controller may have a back-end interface device coupled to the plurality of PDEVs, a front-end interface device coupled to at least one of a host system and a management system, a storage unit and a processor coupled to these. A redundant storage controller may be provided.

Further, the management system may be configured with one or more computers. Specifically, for example, in the case where a management computer displays information (specifically, the management computer displays information at the own display device or the management computer transmits information for display to a remote computer for display), the management computer is the management system. Further, for example, in the case where functions equivalent to functions of the management computer are implemented with a plurality of computers, the plurality of computers (which may include a computer for display in the case where the computer for display performs display) is the management system. Information may be input/output to/from a computer with an input/output device of the computer. While examples of the input/output device can include a display device, a keyboard and a pointing device, other devices may be employed in place of or in addition to at least one of them. Further, information may be output (for example, displayed) or input by a serial interface device or an Ethernet (registered trademark) interface device being employed as a substitute for the input/output device, a computer for display having a display device, a keyboard and a pointing device being coupled to such an interface device, and the computer transmitting information for display to the computer for display or receiving information for input from the computer for display.

Further, in the following description, "LDEV" is an abbreviation for a logical device (or a logical storage device) and can be referred to as a logical volume. The LDEV may be a tangible LDEV or a virtual LDEV. The "tangible LDEV" may be an LDEV based on a physical storage unit (for example, one or more RAID groups) of a storage system which has the LDEV. The "virtual LDEV" may be, for example, an LDEV which is configured with a plurality of virtual areas (virtual storage areas) and which complies with capacity virtualization technique (typically, Thin Provisioning). In the case where the storage controller cannot allocate any of a plurality of actual areas (tangible storage areas) constituting a pool to a virtual area to which an address designated by a write command received from the host system belongs, the actual area may be allocated to the virtual area from the pool, and data to be written associated with the write command may be written in the allocated actual area.

[Embodiment 1]

FIG. 1 illustrates a configuration example of a computer system according to Embodiment 1.

The computer system includes, for example, a plurality of (or one) host computers 110, one (or a plurality of) management computer 120, one (or a plurality of) migration source storage apparatus 130A and one (or a plurality of) migration destination storage apparatus 130B.

The host computer 110, the migration source storage apparatus 130A and the migration destination storage apparatus 130B are coupled via, for example, a first communication network (for example, a storage network such as a SAN (Storage Area network) 150). The host computer 110 is coupled to the SAN 150 via a communication line 151. The migration source storage apparatus 130A is coupled to the SAN 150 via a communication line 152. The migration destination storage apparatus 130B is coupled to the SAN 150 via a communication line 153.

The host computer 110, the management computer 120, the migration source storage apparatus 130A and the migration destination storage apparatus 130B are coupled via, for example, a second communication network (for example, a management network 160 like a LAN (Local Area Network)). The host computer 110 is coupled to the management network 160 via a communication line 161. The management computer 120 is coupled to the management network 160 via a communication line 162. The migration source storage apparatus 130A is coupled to the management network via a communication line 163. The migration destination storage apparatus 130B is coupled to the management network via a communication line 164.

It should be noted that, while the above-described communication lines 151 to 153 and 161 to 164 are configured as a wired line such as, for example, a metal cable and an optical fiber cable, the computers and apparatuses may be wirelessly coupled. In this case, these communication lines are omitted. Further, the number of communication lines is not limited to one, and there may be a plurality of communication lines.

Further, the first communication network like the SAN 150 and the second communication network like the management network 160 may be a common network.

The host computer 110 is an example of the host system, and, for example, includes a CPU 111, a memory 112, a PDEV 113, an input device 114, a display device 115, a plurality of ports 116 and an I/F (interface device) 117.

The CPU 111, which is a processor managing control the whole operation of the host computer 110, reads various kinds of programs stored in the PDEV 113 to the memory 112 and executes the programs.

The memory 112 is used as a work memory of the CPU 111 as well as used for storing various kinds of programs read from the PDEV 113 by the CPU 111 upon activation of the host computer 110.

The PDEV 113 is used for storing and holding various kinds of programs and control data. The input device 114 is configured with, for example, a keyboard switch, a pointing device, a microphone, or the like. The display device 115 is configured with, for example, a liquid crystal display, or the like. Each port 116 is an adapter for coupling the host computer 110 to the SAN 150. The I/F 117 is an adapter for coupling the host computer 110 to the management network 160.

The management computer 120, which is an example of the management system, is a computer apparatus for managing the host computer 110, the migration source storage apparatus 130A and the migration destination storage apparatus 130B. The management computer 120 includes, for example, a CPU 121, a memory 122, a PDEV 123, an input device 124, a display device 125 and an I/F 126.

The CPU 121, which is a processor managing control of the whole operation of the management computer 120, reads various kinds of programs stored in the PDEV 123 and executes the programs.

The memory 122 is used as a work memory of the CPU 121 as well as used for storing various kinds of programs read from the PDEV 123 by the CPU 121 upon activation of the management computer 120.

The PDEV 123 is used for storing and holding various kinds of programs and control data. The input device 124 is configured with, for example, a keyboard switch, a pointing device, a microphone, or the like. The display device 125 is configured with, for example, a liquid crystal display, or the like. The I/F 126 is an adapter for coupling the management computer 120 to the management network 160.

The storage apparatus 130A/130B, which is an example of the storage system, is configured with a plurality of PDEVs 131A/131B and a control unit 132A/132B which controls input/output of data to/from the PDEV 131A/131B. It should be noted that the migration destination storage apparatus 130B is an example of the first storage system, and the migration source storage apparatus 130A is an example of the second storage system. The control unit is an example of the storage controller.

The PDEV 131A/131B is configured with, for example, an expensive disk such as a SCSI disk configured with an HDD or an SSD, an inexpensive disk such as a SATA (Serial AT Attachment) disk and an optical disk. One RAID group is configured with a plurality of PDEVs 131A/131B, and a plurality of (or one) LDEV are configured on a physical storage area provided by one or a plurality of RAID groups. Data from the host computer 110 is stored in this LDEV in unit of block having a prescribed size.

The control unit 132A/132B, which is an example of the storage controller, includes a CPU 133A/133B, a main memory 134A/134B, a non-volatile memory 135A/135B, a cache memory 136A/136B, a plurality of host side ports 137A/137B, a plurality of PDEV side ports 138A/138B and an I/F 139A/139B. The main memory 134A/134B, the non-volatile memory 135A/135B and the cache memory 136A/136B are examples of at least part of a storage unit of the storage controller.

The CPU 133A/133B, which is a processor managing control of the whole operation of the storage apparatus 130A/130B, reads various kinds of programs stored in the PDEV 131A/131B to the main memory 134A/134B and executes the programs.

The main memory 134A/134B is used as a work memory of the CPU 133A/133B as well as used for storing various kinds of programs read from the non-volatile memory 135A/135B by the CPU 133A/133B upon activation of the storage apparatus 130A/130B.

The non-volatile memory 135A/135B is used for storing and holding various kinds of programs and control data. The cache memory 136A/136B is mainly used for temporarily storing data exchanged between the host computer 110 and the PDEV 131A/131B.

The host side port 137A/137B is an adapter for coupling the storage apparatus 130A/130B to the SAN 150, and the PDEV side port 138A/138B is an adapter for the PDEV 131A/131B.

Further, the I/F 139A/139B is an adapter for coupling the storage apparatus 130A/130B to the management network 160.

It should be noted that, in the case of Embodiment 1, one of the two storage apparatuses 130A/130B is an existing storage apparatus which is currently used (hereinafter, this will be referred to as a migration source storage apparatus 130A), and the other is a new storage apparatus introduced in place of the migration source storage apparatus 130A (hereinafter, this will be referred to as a migration destination storage apparatus 130B).

Further, in the case of Embodiment 1, the migration destination storage apparatus 130B is equipped with a so-called external storage coupling function for virtualizing an LU (logical unit) within an external storage apparatus (here, the migration source storage apparatus 130A) and providing the virtualized LU to the host computer 110.

Figure 2:
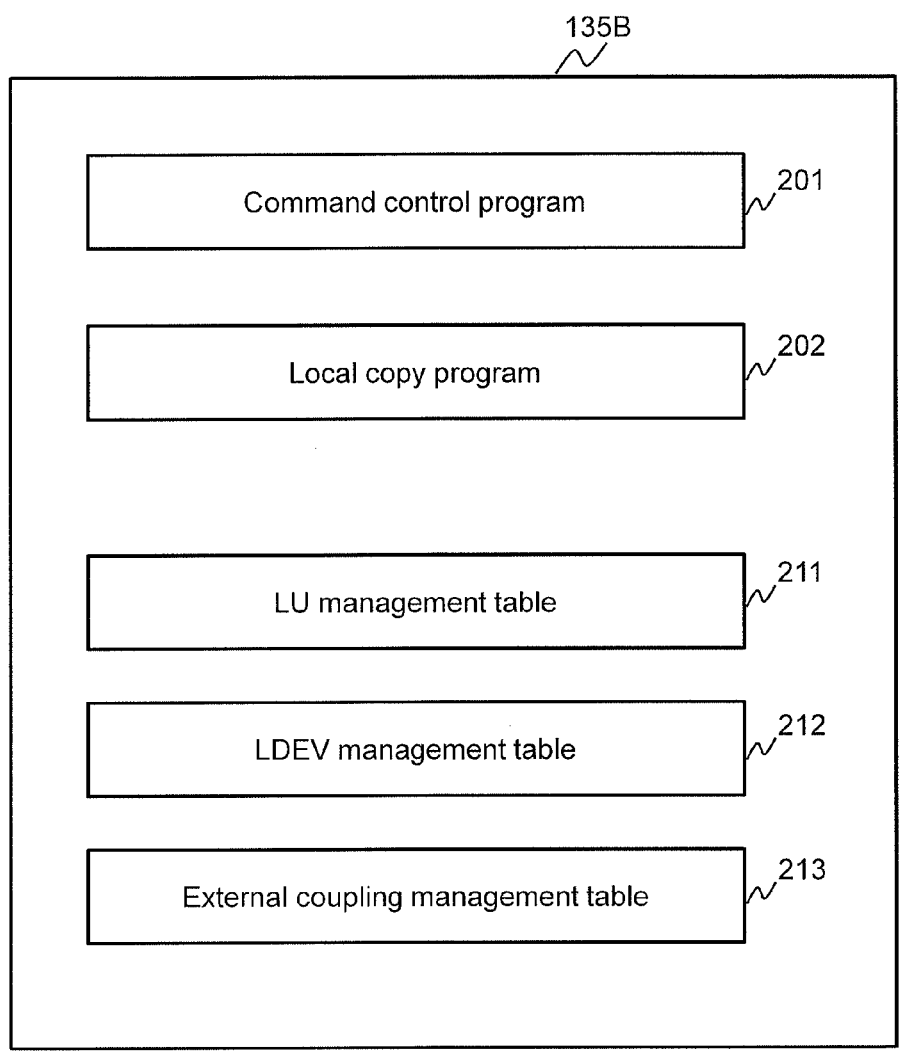
FIG. 2 illustrates an example of a program and a table within a migration destination storage apparatus.

FIG. 2 illustrates an example of a program and a table within the non-volatile memory 135B of the migration destination storage apparatus 130B.

The non-volatile memory 135B stores a command control program 201, a local copy program 202, an LU management table 211, an LDEV management table 212 and an external coupling management table 213. Each of the programs 201 and 202 and the tables 211 to 213 is transferred from the non-volatile memory 135B to the main memory 134B and executed or accessed by the CPU 133B.

The command control program 201 is a program for processing a command (an Inquiry command, a Read command, a Write command, a copy command, or the like) which is used by the CPU 133B of the migration destination storage apparatus 130B to request input/output processing of data received from the host computer 110. Details of processing of this program will be described with reference to FIG. 10.

The local copy program 202 is a program which is used by the CPU 133B of the migration destination storage apparatus 130B to copy an LDEV (LDEV of a copy source) which will be described later to a different LDEV (LDEV of a copy destination) within the same storage apparatus. Details of processing of this program will be described with reference to FIG. 11.

The LU management table 211 is a table for storing the LU defined in the migration destination storage apparatus 130B (storage apparatus which has this table 211), an ID of an LDEV and Inquiry information corresponding to the LU. Details of this table will be described with reference to FIG. 7.

The LDEV management table 212 is a table for storing an LDEV defined in the migration destination storage apparatus 130B (storage apparatus having this table 212), an ID of a RAID group and an ID of a PDEV corresponding to the LDEV. Details of this table will be described with reference to FIG. 8.

The external coupling management table 213 is a table for storing an ID of a storage apparatus which is an external coupling destination and an ID (for example, LUN (Logical Unit Number)) of an LU which is an external coupling destination for each RAID group within the migration destination storage apparatus 130B (storage apparatus having this table 213). Details of this table will be described with reference to FIG. 9. "External coupling" is virtualization of storage space (for example, an LU) of an external storage apparatus according to a storage virtualization technique.

Figure 3:
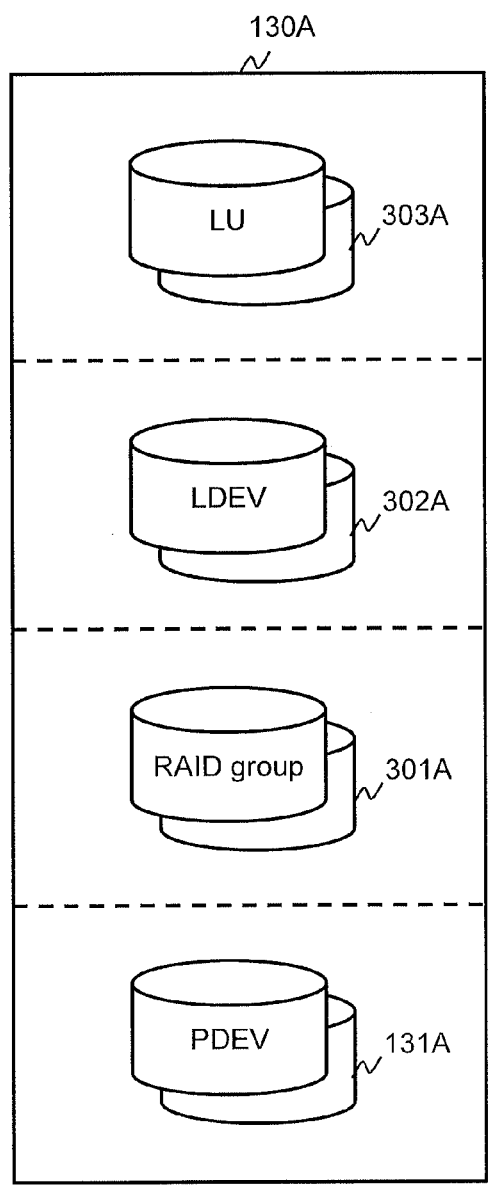
FIG. 3 illustrates an example of a tier structure of a storage area of a migration source storage apparatus.

FIG. 3 illustrates an example of a tier structure of a storage area of the migration source storage apparatus 130A.

The migration source storage apparatus 130A provides a storage area provided by the PDEV 131A to the host computer 110 as an LU 303A.

In this case, a plurality of middle storage tiers for associating the PDEV 131A with a migration source LU 72 are provided between the PDEV 131A and the LU 303A. This middle storage tier can include, for example, the RAID group 301A and the LDEV 302A.

The RAID group 301A, which is a middle storage tier coupling the PDEV 131A which is a lower storage tier and the LDEV 302A which is an upper storage tier, is defined on a storage area provided by each PDEV 131A constituting the RAID group.

The LDEV 302A, which is a middle storage tier coupling the RAID group 301A which is a lower storage tier and the LU 303A which is an upper storage tier, is a storage area configured by aggregating all or part of a storage area of one or more RAID groups 301A or a storage area configured by extracting part of a storage area of the RAID group 301A.

Figure 4:
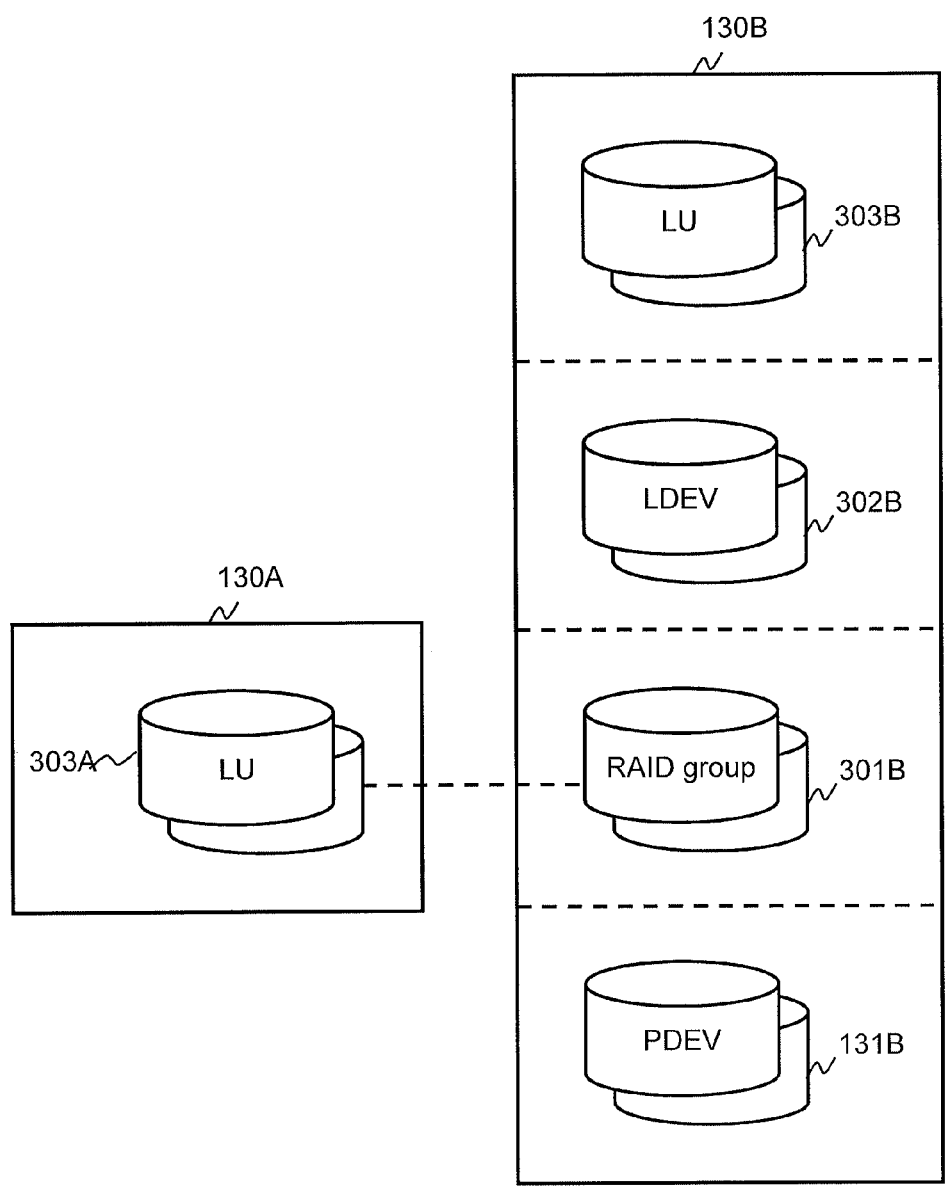
FIG. 4 illustrates an example of a tier structure of a storage area of the migration destination storage apparatus.

FIG. 4 illustrates an example of a tier structure of a storage area of the migration destination storage apparatus 130B.

The migration destination storage apparatus 130B, which has an external storage coupling function as described above, provides the LU 303A of the externally coupled migration source storage apparatus 130A to the host computer 110 as the LU 303B within the own storage apparatus.

In this case, between the LU 303A of the migration source storage apparatus 130A and the LU 303B of the migration destination storage apparatus 130B, a plurality of middle storage tiers for associating the LU 303A of the migration source storage apparatus 130A with the LU 303B of the migration destination storage apparatus 130B are provided.

While this middle storage tier can include, for example, the RAID group 301B and the LDEV 302B, these RAID group 301B and LDEV 302B are not necessarily required, and one or both of the RAID group 301B and the LDEV 302B may be omitted.

The RAID group 301B of the migration destination storage apparatus 130B is a middle storage tier coupling the PDEV 131B of the migration destination storage apparatus 130B which is a lower storage tier or the LU 303A of the migration source storage apparatus 130A and the LDEV 302B of the migration destination storage apparatus 130B which is an upper storage tier.

In the case where the lower storage tier of the RAID group 301B is the PDEV 131B of the migration destination storage apparatus 130, the RAID group 301B is defined on a storage area provided by each PDEV 131B constituting the RAID group.

On the other hand, in the case where the lower storage tier of the RAID group 301B is the LU 303A of the migration source storage apparatus 130A, the RAID group 301B of the migration destination storage apparatus 130B virtualizes the LU 303A of the migration source storage apparatus 130A as if the LU 303A of the migration source storage apparatus 130A were the LU 303B within the migration destination storage apparatus 130B by transferring a read command or a write command from the host computer 110 to the migration source storage apparatus 130A and reading/writing data to/from the migration source storage apparatus 130A.

The LDEV 302B, which is a middle storage tier coupling the RAID group 301B which is a lower storage tier to the LU 303B which is an upper storage tier, is configured with a storage area configured by aggregating all or part of the storage area of one or more RAID groups 301B or configured by extracting part of a storage area of the RAID group 301B.

At least one of the migration destination storage apparatus 130B and the migration source storage apparatus 130A may have a plurality of RAID groups, and at least one of the plurality of RAID groups may be configured with a plurality of PDEVs.

Figure 5:
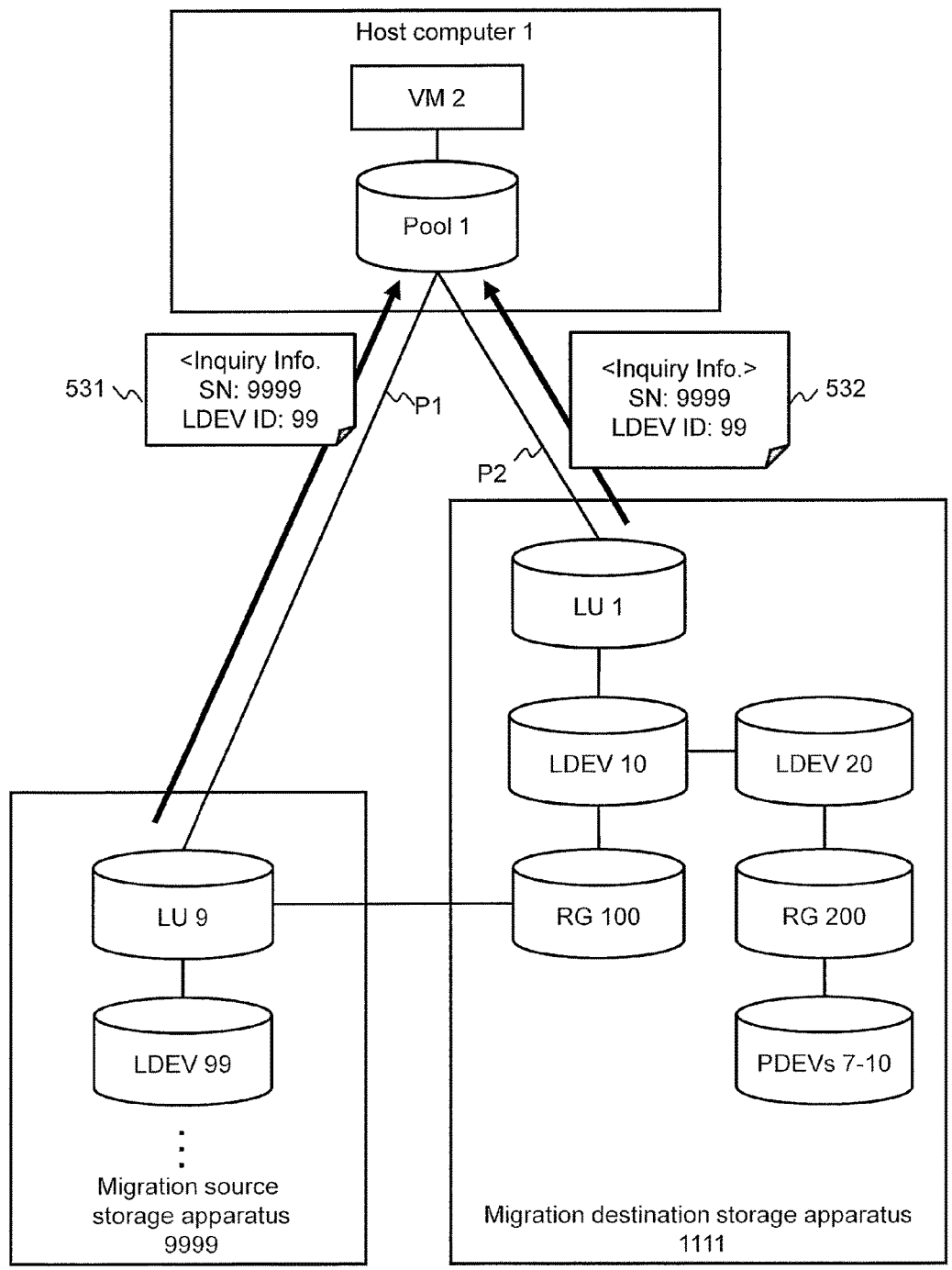
FIG. 5 is a conceptual diagram of data migration processing.

FIG. 5 is a conceptual diagram of data migration processing.

In Embodiment 1, data migration processing includes two steps of access destination migration processing of migrating an access destination of a host computer 1 (host computer 110 whose host ID is "1") from an LU 9 (LU 303A whose LU ID (LUN) is "9") within a migration source storage apparatus 9999 (storage apparatus 130A whose apparatus ID (serial number) is "9999") to an LU 1 (LU 303B whose LU ID is "1") within a migration destination storage apparatus 1111 (storage apparatus 130B whose apparatus ID is "1111") and data copy processing of copying data stored in the LU 9 of the migration source storage apparatus 9999 to the corresponding LU 1 within the migration destination storage apparatus 1111.

The access destination migration processing is performed by the migration destination storage apparatus 1111 and the host computer 1 respectively executing necessary processing according to instructions respectively provided to the migration destination storage apparatus 1111 and the host computer 1 from the management computer 120.

A VM 2 (virtual machine (VM) whose virtual machine ID is "2") running on the host computer 1 uses a pool 1 (pool whose storage pool ID is "1") as an area where data is read/written. The "storage pool" (pool) is storage space associated with a storage area (LU) provided from the storage apparatus and can be shared between virtual machines (VMs). The pool 1 is storage space associated with the LU 9 provided from the migration source storage apparatus 9999.

First, the migration destination storage apparatus 1111 prepares for switching a correspondence destination of the pool 1 of the host computer 1 from the LU 9 to the LU 1 according to an instruction provided from the management computer 120. Specifically, for example, the migration destination storage apparatus 1111 maps the LU 9 to the LU 1 of the migration destination storage apparatus 1111 as an external volume (specifically, stores correspondence relationship in the external coupling management table which will be described later). By this processing, the LU 9 is virtualized as the LU 1, and the host computer 1 can read/write data to/from the LU 9 of the migration source storage apparatus 9999 via the migration destination storage apparatus 1111. It should be noted that, specifically, for example, the LU 9 is externally coupled as an RG 100 as a virtual device, and the LU 1 is associated with an LDEV 10 (LDEV 302B whose LDEV ID is "10") based on the RG 100 (RAID group 301B whose RG ID is "100").

Subsequently, the migration destination storage apparatus 1111 acquires Inquiry information of the LU 9 of the migration source storage apparatus 9999 by issuing an Inquiry command in which the LU 9 is designated to the migration source storage apparatus 9999. The migration destination storage apparatus 1111 configures the acquired Inquiry information as Inquiry information of the LU 1 to which the LU 9 is mapped (hereinafter, this processing will be referred to as Inquiry response virtualization processing). Here, instead of the Inquiry information of the LU 9 being acquired from the migration destination storage apparatus 1111, the Inquiry information of the LU 9 may be configured as the Inquiry information of the LU 1 according to an instruction from the management computer 120. Specifically, for example, the migration destination storage apparatus 1111 may acquire Inquiry information of the LU 9 of the migration source storage apparatus 9999 from the management computer 120 and configure the acquired Inquiry information of the LU 9 as the Inquiry information of the LU 1 of the migration destination storage apparatus 1111.

Through this Inquiry response virtualization processing, in the case where the host computer 1 adds a path P2 to the LU 1 as a path relating to the pool 1, it is possible to allow the host computer 1 to recognize a path P1 to the LU 9 and the path P2 to the LU 1 as alternate paths of the same pool 1.

Further, by configuring the Inquiry information 531 of the LU 9 at the Inquiry information of the LU 1, in the case where the host computer 1 deletes the path P1 from the pool 1 after that as will be described later, all of the read command and the write command for the pool 1 are transmitted to the migration destination storage apparatus 1111, and read processing and write processing for these read command and write command are executed by the migration destination storage apparatus 1111.

At this time, because the host computer 1 remains to recognize that the read command and the write command are issued to the migration source storage apparatus 9999, data input/output processing at the host computer 1 is not stopped.

After that, the management computer 120 gives an instruction to add the path P2 to the LU 1 and delete the path P1 to the LU 9 to the host computer 1. Through this processing, it is possible to migrate the LU associated with the pool 1 from the migration source to the migration destination without stopping data exchange of the VM 1 running on the host computer 1. The access destination migration processing has been described above.

Meanwhile, the data copy processing is performed by the migration destination storage apparatus 1111 executing necessary processing according to an instruction provided from the management computer 120 to the migration destination storage apparatus 1111.

The migration destination storage apparatus 1111 defines a new RG 200 (RAID group whose RG ID is "200") associated with PDEVs 7 to 10 (five PDEVs whose PDEV IDs are "5" to "9") according to an instruction from the management computer 120 and defines a new LDEV 20 (LDEV whose LDEV ID is "20") associated with the RG 200.

Then, the migration destination storage apparatus 1111 copies data from the LDEV 10 to the new LDEV 20 (actually, copy between RGs constituting respective LDEVs is executed), and then, associates the LU 1 of the migration destination storage apparatus 1111 with the PDEVs 7 to 10 by replacing the RG 100 with the new RG 200.

Through the above processing, data stored in the LU 9 of the migration source storage apparatus 9999 is migrated to the PDEVs 7 to 10 of the migration destination storage apparatus 1111, and data is read/written from/in the PDEVs 7 to 10 of the migration destination storage apparatus 1111 via the LU1 of the migration destination storage apparatus 1111, the LDEV 10 and the new RG 200.

Through such data migration processing, it is possible to migrate data from the LU 9 to the LU 1 while avoiding stop of data exchange.

However, in a comparative example of Embodiment 1, because the Inquiry information is configured in unit of LDEV, in the case where the migration destination storage apparatus 1111 receives an Inquiry command in which the LU 1 is designated from the host computer 1, the migration destination storage apparatus 1111 returns a response including an Inquiry command in which Inquiry information 532 which is the same as the Inquiry information 531 of the LDEV 99 associated with the copy source LU 9 of the LU 1 is designated to the host computer 1. Therefore, while an apparatus ID (for example, a serial number) of the migration destination storage apparatus is "1111", the Inquiry information including the apparatus ID of the migration source storage apparatus of "9999" is returned from the migration destination storage apparatus 1111 to the host computer 1.

As described above, a host computer which changes processing according to at least part of the Inquiry information from a storage apparatus to be recognized is known. It is desirable that Inquiry configuration information including the apparatus ID, model name, or the like, of the migration destination storage apparatus 1111 is returned to such a host computer. However, if such Inquiry configuration information is returned, it becomes necessary to stop data exchange to the host computer 1.

Therefore, in Embodiment 1, Inquiry information (information included in a response to the Inquiry command) is configured in unit of LU instead of in unit of LDEV. Therefore, in the case where a plurality of different LUs are associated with the same LDEV, Inquiry information is configured for each of the plurality of LUs. In Embodiment 1, after data migration processing (for example, triggered by detection of completion of data migration processing), VM migration processing is performed. "Detection of completion of data migration processing" may be, for example, reception of a completion notification of data migration by the management computer 120 from at least one of the migration destination storage apparatus 1111 and the migration source storage apparatus 9999.

Figure 6:
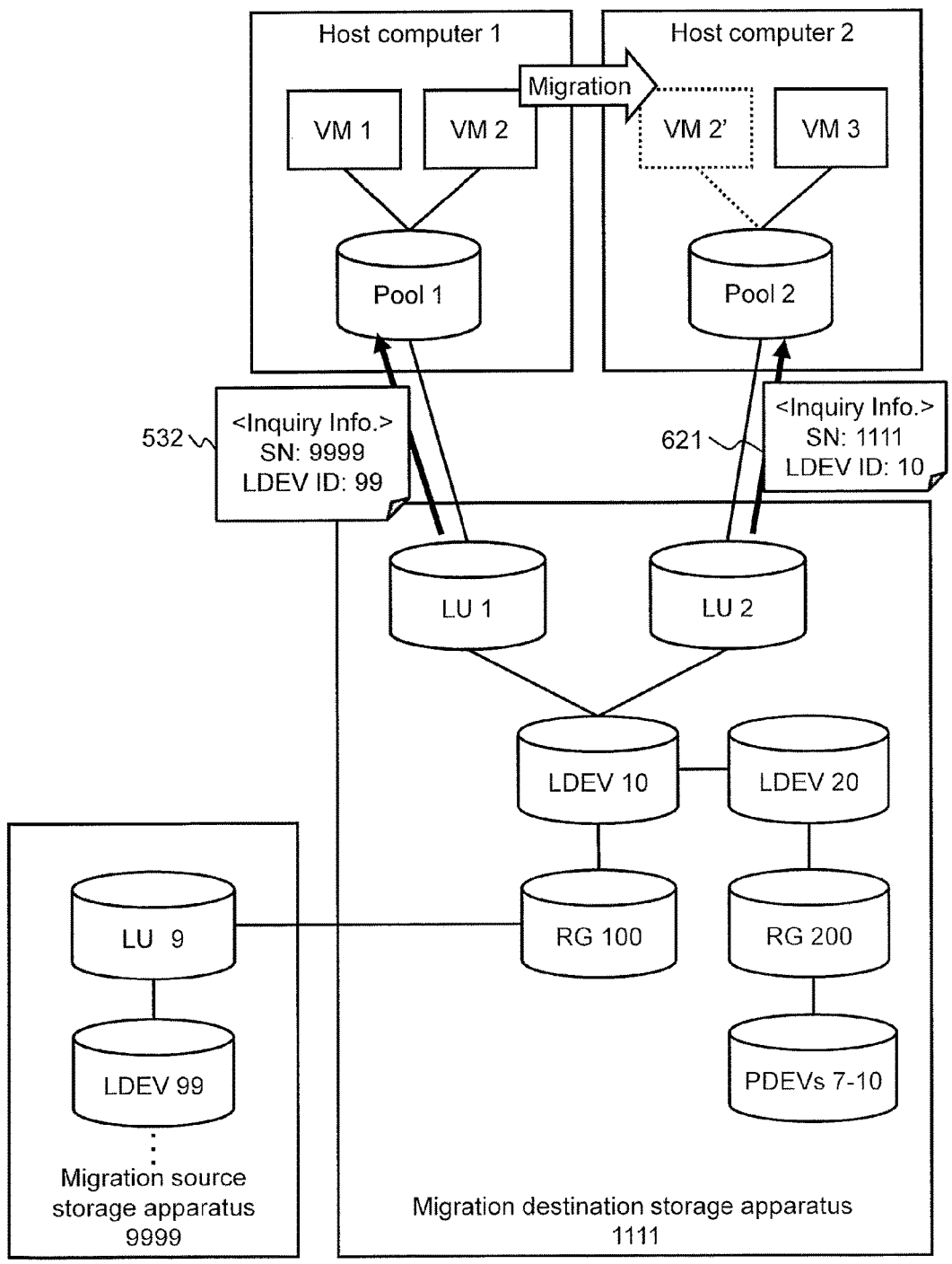
FIG. 6 is a conceptual diagram of command response control processing performed after data migration processing in Embodiment 1.

FIG. 6 is a conceptual diagram of command response control processing performed after data migration processing in Embodiment 1.

The "command response control processing" is processing of controlling information to be configured for a response to a command received by the storage apparatus, and, in Embodiment 1, includes VM migration processing.

First, the migration destination storage apparatus 1111 defines a new LU 2 for the LDEV 10 with which the LU 1 is associated according to an instruction from the management computer 120 which detects completion of data migration processing. Then, Inquiry information different from Inquiry information of the LU 1 is associated with the LU 2 (stored in the LU management table 212 (entry corresponding to the LU 2) which will be described later). Specifically, while the Inquiry information of the LU 1 includes an apparatus ID, or the like, of the migration source storage apparatus 9999 which provides a copy source LU 9 of the LU 1, and does not include information (such as an apparatus ID) relating to the migration destination storage apparatus 1111, the Inquiry information of the LU 2 includes information (such as an apparatus ID) relating to the migration destination storage apparatus 1111 which provides the LU 2.

The host computer 2 then creates migration destination VM 2' at the host computer 2, for example, according to an instruction from the management computer and configures a pool 2 associated with the LU 2 as a pool of the VM 2'.

Then, migration from the UM 2 to the UM 2' is performed without stopping input/output processing of data at the host computer 1 using a virtual machine migration function of at least one of the host computers 1 and 2. By this means, in the case where the UM 2 on the host computer 1 is migrated to the UM 2' on the host computer 2, the VM can be migrated from the pool 1 which is recognized as the LU 9 of the migration source storage apparatus 9999 to the pool 2 which is recognized as the LU 2 of the migration destination storage apparatus 1111 without stopping data input/output processing at the host computer 1. It should be noted that, in this UM migration, while it is not necessary to migrate data between the pools, there can be a case where the host computer 1 issues a copy instruction for copying data between the pool 1 and the pool 2 (between the LU 1 and the LU 2) to the migration destination storage apparatus 1111. In this case, the migration destination storage apparatus 1111 specifies that the copy instruction is directed to the same LDEV through local copy processing which will be described later with FIG. 12 and does not perform copy processing. Further, the pools 1 and 2 may be shared between the VM.

As described above, in Embodiment 1, the Inquiry information is configured for each LU instead of for each LDEV. Therefore, different Inquiry information is configured for different LU 1 and LU 2 associated with the same LDEV 10. By this means, the migration destination storage apparatus 1111 does not need to simulate Inquiry information of the migration source after data migration processing, and can return Inquiry information (correct Inquiry information) including information relating to the migration destination storage apparatus 1111 after data migration processing.

In Embodiment 1, such switching of the Inquiry information can be performed without stopping I/O from the host computer side, because VM migration (for example, VM live migration) is performed from the VM 2 which uses the pool 1 corresponding to the LU 1 associated with the LDEV 10 to the UM 2' which uses the pool 2 corresponding to the LU 2 newly associated with the same LDEV 10.

Further, in Embodiment 1, it is expected that migration from the pool 1 to the pool 2 is not required.

Each table stored in the non-volatile memory 136B of the migration destination storage apparatus 1111 will be described below with reference to FIG. 7 to FIG. 9.

FIG. 7 illustrates an example of the LU management table 211.

The LU management table 211 has an entry for each LU defined in the migration destination storage apparatus 1111, and each entry holds an LU ID 701, an LDEV ID 702 and Inquiry information 703.

The LU ID 701 is an ID of an LU defined in the migration destination storage apparatus 1111, and is, for example, an LUN.

The LDEV ID 702 is an ID of an LDEV defined in the migration destination storage apparatus 1111.

The Inquiry information 703, which is information corresponding to the LU (LU ID) designated in the Inquiry command, is information included in a response (Inquiry response) to the Inquiry command. The Inquiry information includes, for example, an ID of the storage apparatus (for example, "SN 1111") which provides the designated LU, a vendor name of the storage apparatus (for example, "Company H"), an LDEV ID of the LDEV associated with the designated LU, or the like. In the case where the Inquiry information is unknown, "Unknown" which means that the Inquiry information is unknown may be configured as the Inquiry information. The storage apparatus ID included in the Inquiry information may include a serial number of the storage apparatus.

For example, according to rows 711 and 712, different LU 1 and LU 2 are associated with the same LDEV 10, a response to the Inquiry command in which the LU 1 is designated includes Inquiry information including "SN 9999, Company A, . . . ", and a response to the Inquiry command in which the LU 2 is designated includes Inquiry information including "SN 1111, Company H, . . . ".

FIG. 8 illustrates an example of the LDEV management table 212.

The LDEV management table 212 has an entry for each LU defined in the migration destination storage apparatus 1111, and each entry holds an LDEV ID 801, a RAID group ID 802 and a PDEV ID 803.

The LDEV ID 801 is an ID of the LDEV defined in the migration destination storage apparatus 1111.

The RAID group ID 802 is an ID of a RAID group (RAID group defined in the migration destination storage apparatus 1111) associated with the LDEV.

The PDEV ID 803 is a list of IDs of PDEVs constituting the RAID group (RAID group defined in the migration destination storage apparatus 1111) associated with the LDEV. In the case where a logical volume of an externally coupled external storage apparatus is virtually defined as the RAID group, a value meaning external coupling, like "External Device" may be set as the PDEV ID 803 corresponding to the RAID group.

For example, according to a row 811, the LDEV 20 is based on the RG 200, and the RG 200 is configured with PDEVs 7 to 10.

FIG. 9 illustrates an example of the external coupled storage management table 213.

The external coupled storage management table 213 has an entry for each RAID group defined in the migration destination storage apparatus 1111, and each entry holds a RAID group ID 901, an external storage apparatus ID 902 and an external LU ID 903.

The RAID group ID 901 is an ID of the RAID group defined in the migration destination storage apparatus 1111.

The external storage apparatus ID 902 is an ID of the external storage apparatus in which an external logical volume associated as the RAID group is defined. The external LU ID 903 is an LU ID (LU ID defined in the external storage apparatus) of the external logical volume associated as the RAID group. The values of the IDs 902 and 903 may be "–" which means that the RAID group is not an externally coupled logical volume in the case where the corresponding RAID group is not externally coupled external logical volume.

For example, according to a row 911, the RAID group: RG 100 is a RAID group to which the LU: LUN 9 of the storage apparatus: SN 9999 is externally coupled.

Processing performed in Embodiment 1 will be described below with reference to FIG. 10. While each flowchart illustrates outline of each processing necessary for understanding and implementation of the present invention, the order of the processing is not limited to the illustrated order. It should be noted that a step will be abbreviated as "S" in the following description.

Figure 10:
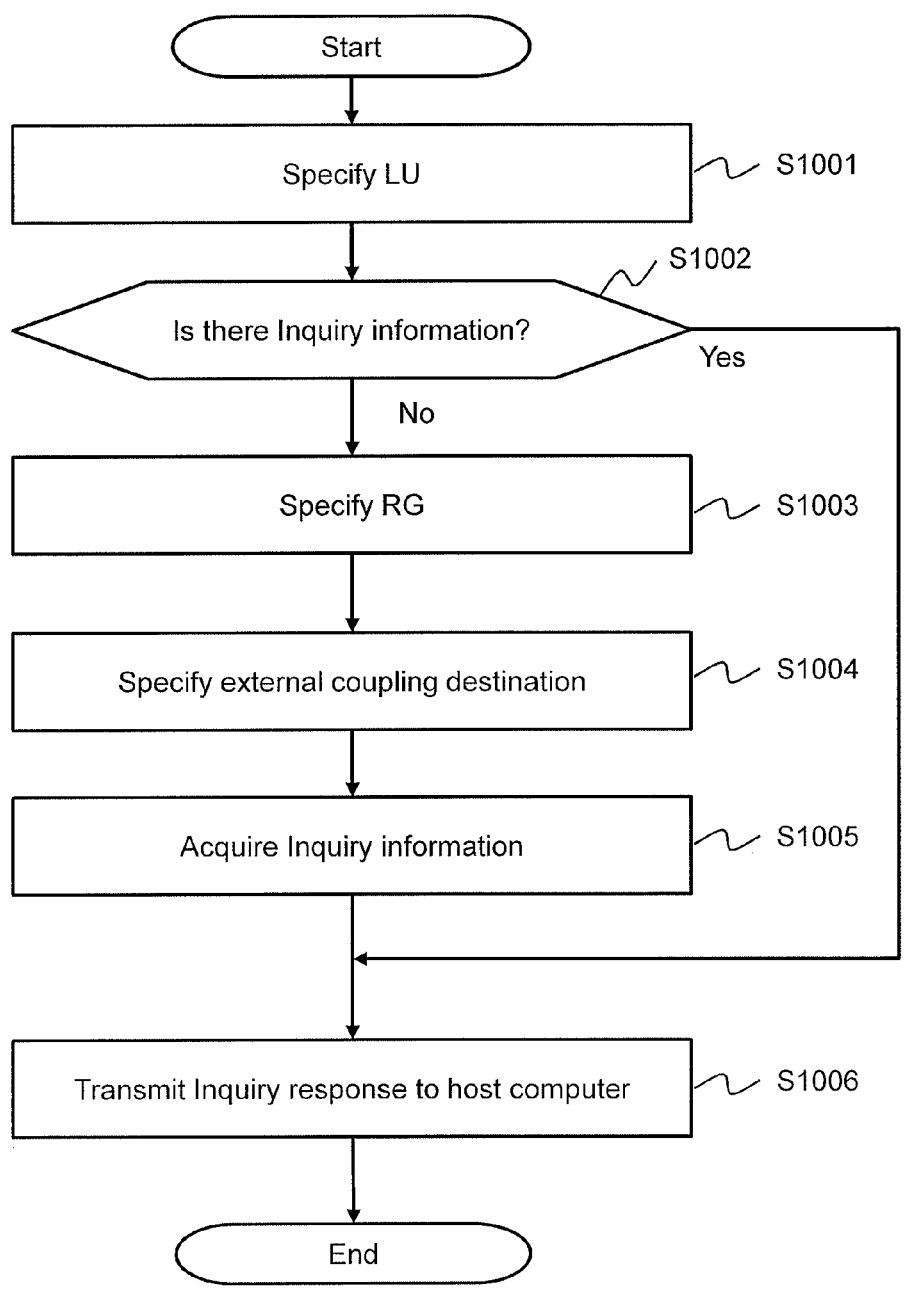
FIG. 10 is a flowchart illustrating flow of Inquiry response processing.

FIG. 10 is a flowchart illustrating flow of Inquiry response processing according to Embodiment 1.

This processing is triggered by the migration destination storage apparatus 1111 receiving an Inquiry command from the host computer 1.

(S1001) A command control program 201 (hereinafter, a "program 201" in the description of FIG. 10) of the migration destination storage apparatus 1111 acquires from the received Inquiry command an ID of the LU designated in the Inquiry command, searches a column of the LU ID 701 of the LU management table 211 using the acquired LU ID and acquires the corresponding LDEV ID 702 and Inquiry information 703.

(S1002) The program 201 judges whether or not the Inquiry information 703 acquired in S1001 is valid (whether or not the information is not "Unknown"). In the case where the value of the Inquiry information 703 is valid as a result (S1002: Yes), the program 201 executes processing of S1006 which will be described later. On the other hand, in the case where the value of the Inquiry information 703 is not valid (S1002: No), the program 201 executes processing of S1003 which will be described later.

(S1003) The program 201 searches a column of the LDEV ID 801 of the LDEV management table 212 using the LDEV ID 702 acquired in S1002 and acquires the corresponding RAID group ID 802.

(S1004) The program 201 searches a column of the RAID group ID 901 of the externally coupled storage management table 213 using the RAID group ID 802 acquired in S1003 and acquires the corresponding external storage apparatus ID 902 and external LU ID 213.

(S1005) The program 201 acquires Inquiry information corresponding to the acquired external LU ID 213 from the external storage apparatus corresponding to the acquired external storage apparatus ID 902. Specifically, for example, the program 201 transmits an Inquiry command in which the acquired external LU ID 213 is designated to the external storage apparatus corresponding to the acquired external storage apparatus ID 902 and receives a response to the Inquiry command (Inquiry response including Inquiry information corresponding to the acquired external LU ID 213) from the external storage apparatus.

(S1006) The program 201 transmits the Inquiry response including the Inquiry information acquired in S1002 or S1005 to the host computer 1 as a response to the Inquiry command received from the host computer 1.

Embodiment 1 has been described above. It should be noted that, at the host computer, generation, deletion and migration of VM may be performed by an OS (operating system) executed at the host computer or may be performed by a VM control program like a hypervisor executed on the host computer.

[Embodiment 2]

Embodiment 2 will be described. Here, a difference with Embodiment 1 will be mainly described, and description regarding points in common with Embodiment 1 will be omitted or abbreviated.

Figure 11:
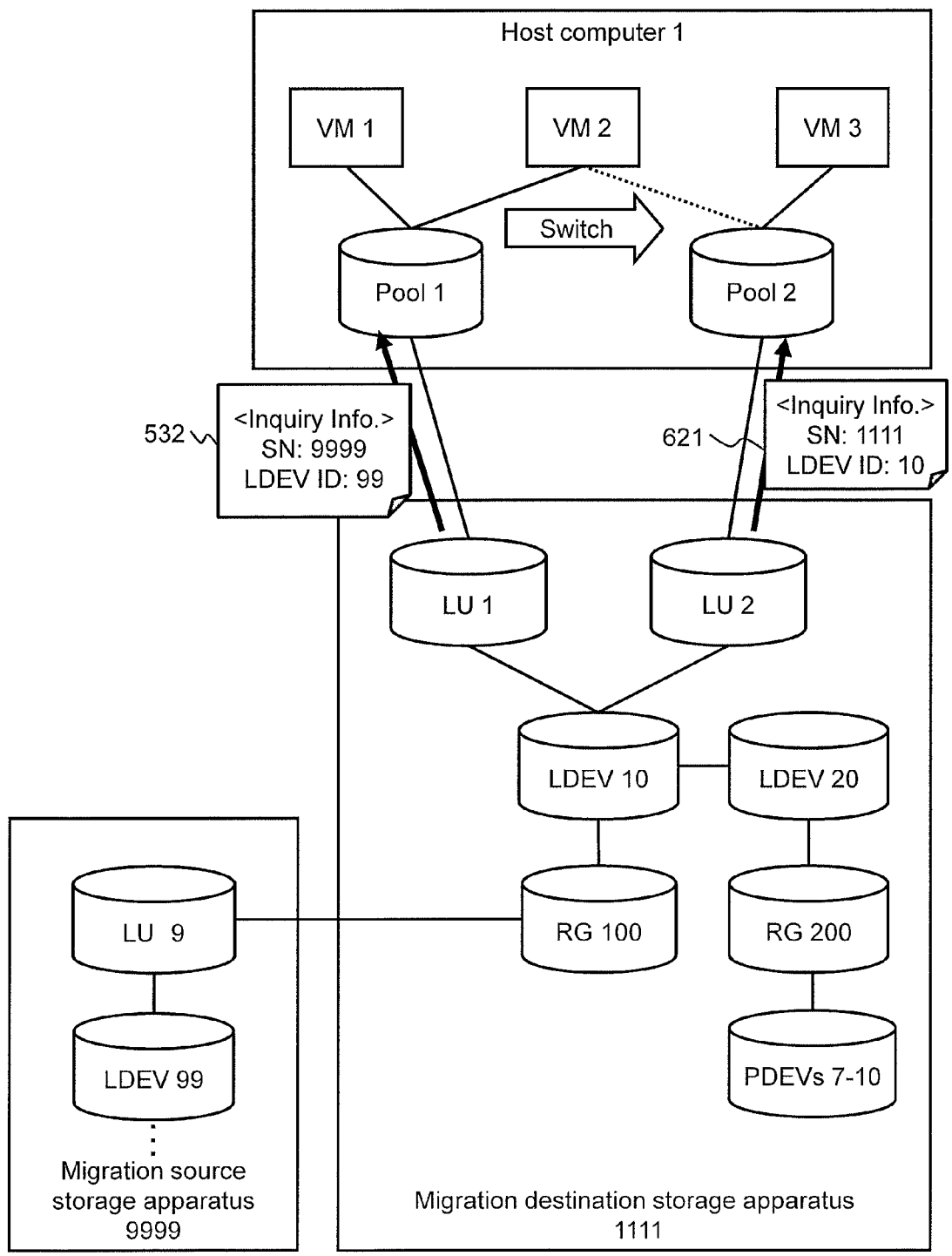
FIG. 11 is a conceptual diagram of command response control processing performed after data migration processing in Embodiment 2.

FIG. 11 is a conceptual diagram of command response control processing performed after data migration processing in Embodiment 2.

The command response control processing according to Embodiment 2 also includes VM migration processing. In Embodiment 2, a pool used by the VM 2 on the host computer 1 can be migrated from the pool 1 to the pool 2 without stopping input/output of data at the host computer 1.

First, the migration destination storage apparatus 1111 defines a new LU 2 with respect to the LDEV 10 with which the LU 1 is associated according to an instruction from the management computer 120. The Inquiry information of this LU 2 is different from that of LU 1.

Then, the host computer 1 defines the pool 2 at the host computer 1, for example, according to an instruction from the management computer 120 and configures the pool 2 with which the LU 1 of the migration destination storage apparatus 1111 is associated as a pool of a migration destination to be used by the VM 2.

Then, the pool is migrated from the pool 1 to the pool 2, for example, using a pool migration function of the host computer 1 without stopping input/output of data at the host computer 1.

By this means, it is possible to migrate the pool to be used by the VM 2 on the host computer 1 from the pool 1 recognized as the LU 1 of the migration source storage apparatus 9999 to the pool 2 recognized as the LU 2 of the migration destination storage apparatus 1111 without stopping input/output of data at the host computer 1.

Figure 12:
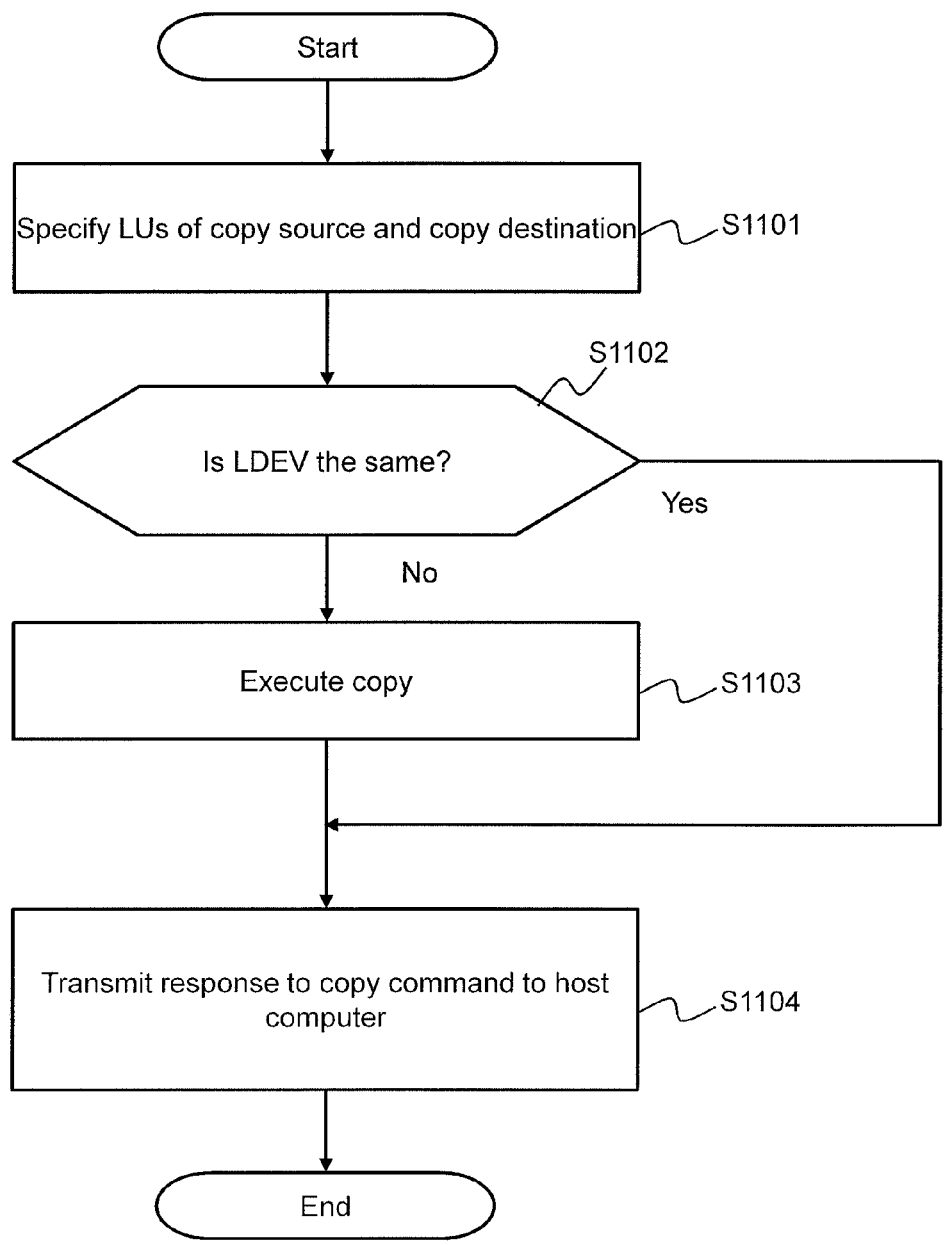
FIG. 12 is a flowchart illustrating flow of local copy processing.

FIG. 12 is a flowchart illustrating flow of local copy processing.

In Embodiment 2, when the pool to be used by the VM 2 on the host computer 1 is migrated, there can be a case where the host computer 1 issues a copy command for copying data between the pool 1 and the pool 2 to the migration destination storage apparatus 1111, and processing in response to this command is performed. This processing is triggered by the migration destination storage apparatus 1111 receiving the copy command from the host computer 1.

(S1201) A command control program 201 (hereinafter, a "program 201" in the description of FIG. 12) of the migration destination storage apparatus 1111 acquires an ID of a copy source LU and an ID of a copy destination LU from the received copy command. The program 201 searches a column of the LU ID 701 of the LU management table 211 respectively using the acquired copy source LU ID and copy destination LU ID and acquires corresponding LDEV ID 702 for each of the copy source LU ID and the copy destination LU ID.

(S1202) A local copy program 202 (hereinafter, a "program 202" in the description of FIG. 12) of the migration destination storage apparatus 1111 compares the copy source LDEV ID with the copy destination LDEV ID acquired in S1201 and judges whether or not these LDEV ID are the same. In the case where these IDs are different as a result (S1202: No), copy processing (S1203) is executed. On the other hand, in the case where these IDs are the same (S1202: Yes), copy processing (S1203) is skipped, and S1204 which will be described later is executed.

(S1203) The program 202 copies data from the LDEV having the copy source LDEV ID acquired in S1201 to the LDEV which is the copy destination LDEV.

(S1204) The program 201 transmits a copy completion response (Good response) to the copy command to the host computer 1.

Also in Embodiment 2, it is possible to switch Inquiry information without stopping I/O from the host computer side, because the pool to be used by the VM 2 is switched from the pool 1 corresponding to the LU 1 associated with the LDEV 10 to the pool 2 corresponding to the LU 2 associated with the same LDEV 10.

Further, in Embodiment 2, while a copy command for migrating the pool from the pool 1 to the pool 2 is issued, the migration destination storage apparatus 1111 does not have to perform copy between LDEVs for specifying that the migration source LU 1 and the migration destination LU 2 are associated with the same LDEV.

[Embodiment 3]

Embodiment 3 will be described. Here, a difference with Embodiments 1 and 2 will be mainly described, and description regarding points in common with Embodiments 1 and 2 will be omitted or abbreviated.

Figure 13:
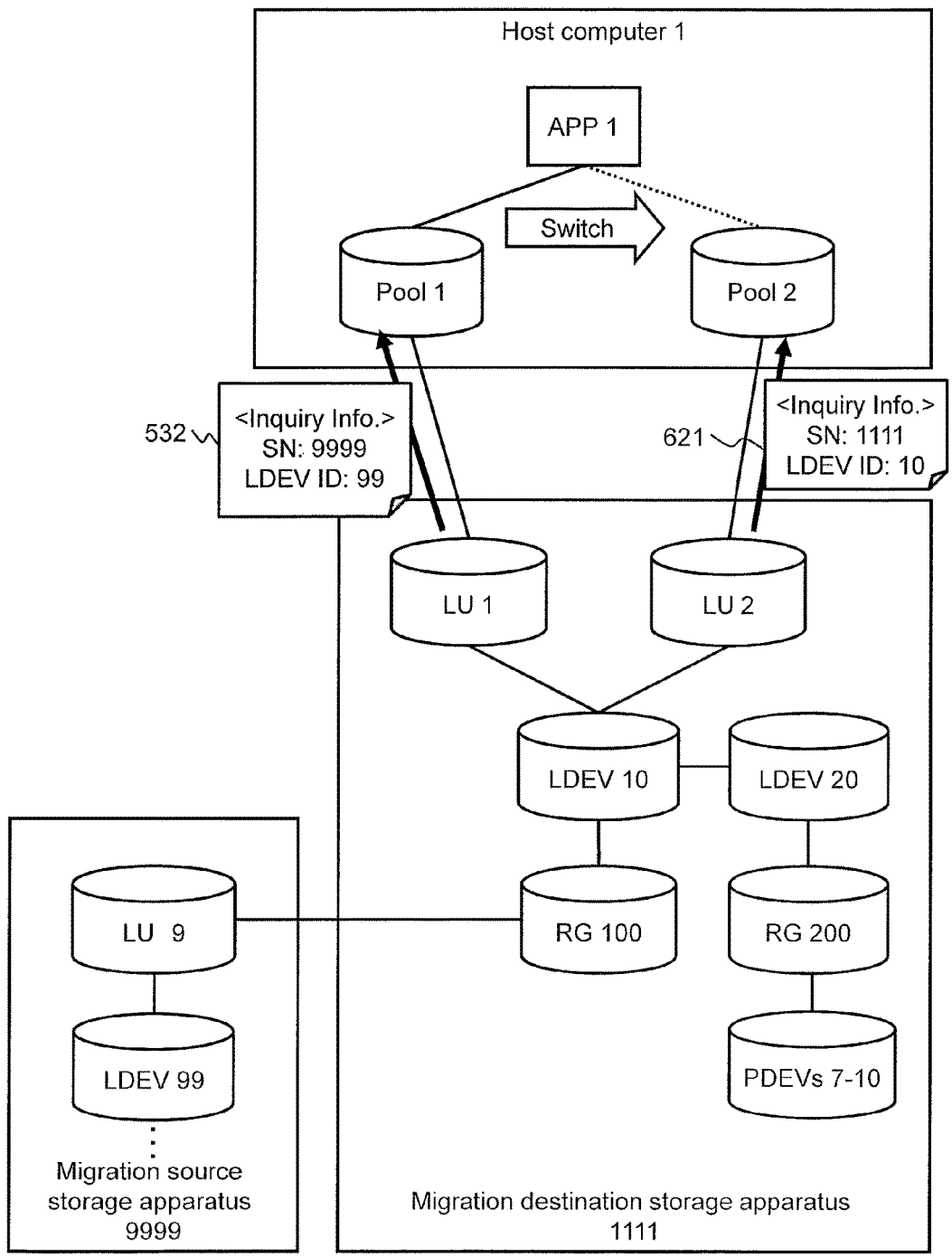
FIG. 13 is a conceptual diagram of command response control processing performed after data migration processing in Embodiment 3.

FIG. 13 is a conceptual diagram of command response control processing performed after data migration processing in Embodiment 3.

The command response control processing in Embodiment 3 includes processing of migrating a pool to be used by an APP (application program) which does not run on the VM. According to FIG. 13, the pool to be used by an APP 1 (APP whose APP ID is "1") which runs on the host computer 1 is switched from the pool 1 to the pool 2.

First, the migration destination storage apparatus 1111 defines a new LU 2 with respect to the LDEV 10 with which the LU 1 is associated according to an instruction from the management computer 120. Inquiry information of this LU 2 is different from the Inquiry information of the LU 1.

Then, the host computer 1 defines the pool 2 in the host computer 1, for example, according to an instruction from the management computer 120, stops the APP 1, changes the pool to be used by the APP 1 from the pool 1 to the pool 2 and resumes the APP 1.

By this means, while the APP 1 is temporarily stopped, it is possible to shorten a period during which the APP 1 is stopped compared to a case where Embodiment 3 is not employed.

Specifically, for example, in a comparative example of Embodiment 3 (an example where Embodiment 3 is not employed), the following processing is required.

(S3-1) The host computer 1 unmounts the LU 1 (pool 1) according to an instruction from the management computer 120.

(S3-2) The migration destination storage apparatus 1111 deletes the LU 1 and defines a new LU 2 with which Inquiry information different from the Inquiry information of the LU 1 is associated according to an instruction from the management computer 120.

(S3-3) The host computer 1 defines the pool 2 in the host computer 2 according to an instruction from the management computer 120.

(S3-4) The host computer 1 changes the pool to be used by the APP 1 from the pool 1 to the pool 2 according to an instruction from the management computer 120.

According to the comparative example of Embodiment 3, all the time during the above-described (S3-1) to (S3-4), the APP 1 has to be stopped. In other words, according to the comparative example of Embodiment 3, because Inquiry information is configured in unit of LDEV, (S3-1) is required before (S3-2), and the APP 1 is required to be stopped to perform (S3-1).

According to Embodiment 3, before the APP 1 is stopped, the LU 2 is associated (defined) with the LDEV 10 with which the LU 1 is associated, and the pool 2 with which the LU 2 is associated is defined in the host computer 1. That is, before the APP 1 is stopped, (S3-2) and (S3-3) have already been performed, and (S3-1) is not required. Therefore, the APP 1 only has to be stopped during processing (S3-4) for migrating the pool to be used by the APP 1. Specifically, the host computer 1 only has to stop the APP 1 when starting S3-4 and resume the APP 1 when finishing S3-4. As a result, it is possible to shorten a period during which the APP 1 is stopped.

It should be noted that, in Embodiment 3, a copy command for Performing copy between pools is not issued, and the pool is manually changed from the pool 1 to the pool 2 after the APP 1 is stopped.

[Embodiment 4]

Embodiment 4 will be described. Here, a difference with Embodiments 1 to 3 will be mainly described, and description regarding points in common with Embodiments 1 to 3 will be omitted or abbreviated.

In Embodiment 4, a reserve command is transmitted from the host computer (or the VM). In the following description, while it is assumed that the migration destination storage apparatus receives the reserve command, the migration destination storage apparatus can execute the following processing if the migration source storage apparatus (or a storage apparatus which is neither a migration source nor a migration destination) receives the reserve command.

Figure 14:
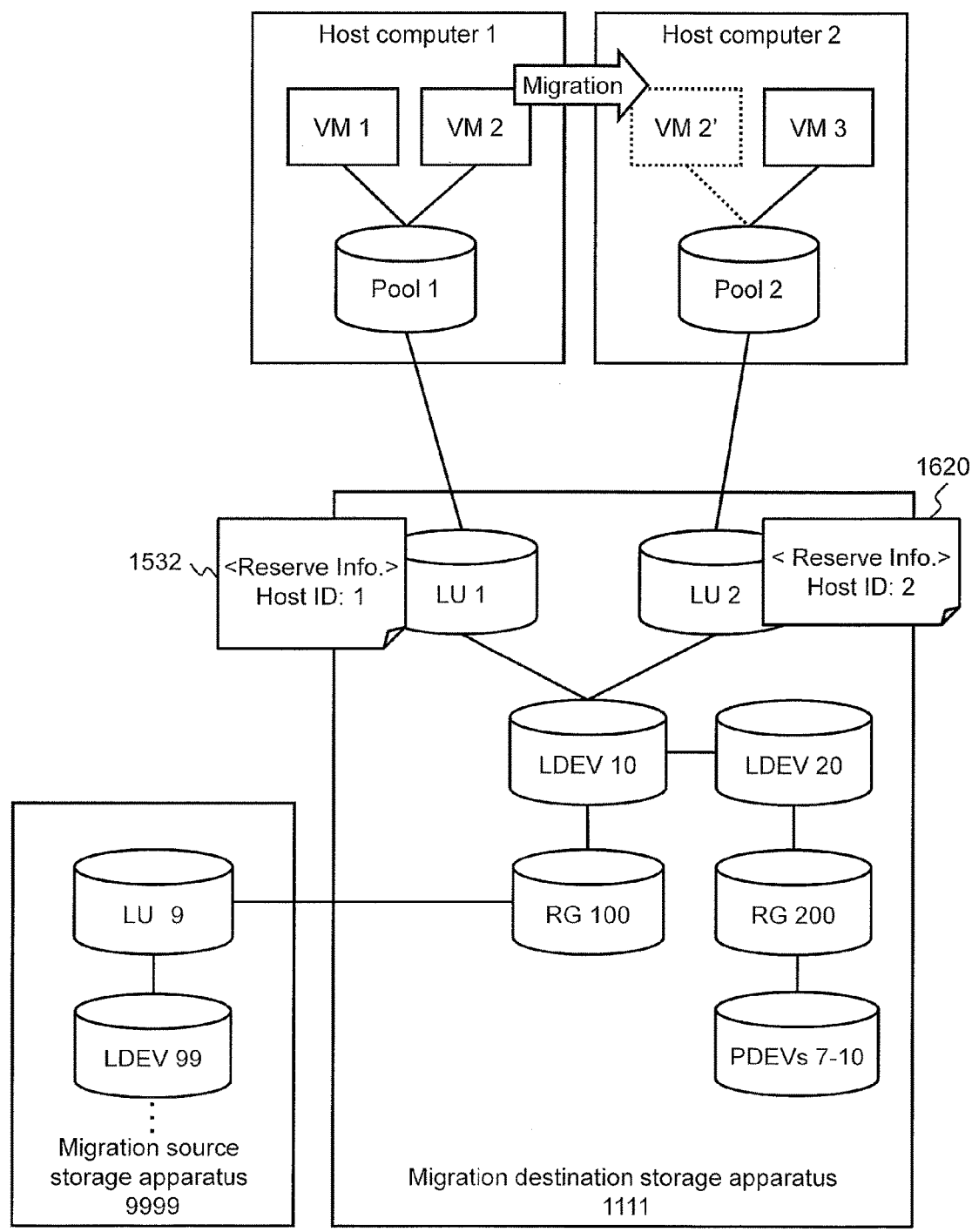
FIG. 14 is a conceptual diagram of command response control processing performed in Embodiment 4.

FIG. 14 is a conceptual diagram of command response control processing performed in Embodiment 4. FIG. 15 illustrates an example of the LU management table according to Embodiment 4.

In Embodiment 4, the migration destination storage apparatus 1111 (control unit 132B) accepts a reserve command from the host computer (or the VM). The reserve command includes a transmission source ID of the reserve command. The transmission source ID may be configured with at least one of an ID of the host computer, an ID of a port of the host computer (for example, WWN (World Wide Name)), an ID of the VM and an ID of a virtual port of the VM. In embodiment 4, it is assumed that the transmission source ID is an ID of the host computer.

Further, in the reserve command, an ID of a device to be reserved is designated. If the LU is a device to be reserved, the reserve command includes an ID of the LU to be reserved.

In the case where the migration destination storage apparatus 1111 (control unit 132B) receives the reserve command and succeeds in reserve (in the case where reserve according to the reserve command is allowed), the migration destination storage apparatus 1111 manages information including a transmission source ID (host computer ID) designated in the reserve command in unit of LU. That is, the reserve information is associated with the LU instead of being associated with the LDEV. Specifically, for example, in the reserve command, an LU (LU ID) is designated as a device to be reserved, and reserve information corresponding to the designated LU is stored in the LU management table 211' (table of the migration destination storage apparatus 1111) as illustrated in FIG. 15.

According to a comparative example of Embodiment 4, the reserve information is configured in unit of LDEV (the reserve information is associated with the LDEV). Therefore, in the case where the migration destination storage apparatus 1111 receives a reserve command in which the LU 1 associated with the LDEV 10 is designated from the host computer 1 before receiving a reserve command in which the LU 2 associated with the LDEV 10 is designated from the host computer 2, the reserve information (information meaning that the LDEV 10 is reserved by the host computer 1) including an ID of the host computer 1 is configured for the LDEV 10 with which the LU 1 is associated. Even if the migration destination storage apparatus 1111 receives a reserve command in which the LU 2 associated with the LDEV 10 is designated from the host computer 2 after that, because the reserve information has already been configured for the LDEV 10 with which the LU 2 is associated (because the LDEV 10 has already been reserved by the host computer 1), the migration destination storage apparatus 1111 returns a failure response (response meaning that reserve is failed) to the host computer 2 as a response to the reserve command from the host computer 2. This problem of the comparative example can occur even if the storage apparatus is not migrated, this problem is more likely to occur when the storage apparatus is migrated, because if the LDEV 99 of the migration source storage apparatus 9999 is reserved in advance, the LDEV 10 with which the LU 1 corresponding to the LU 9 associated with the LDEV 99 is associated is also configured as reserved.

On the other hand, according to Embodiment 4, the reserve information is configured in unit of LU. Therefore, as illustrated in FIG. 15, different reserve information can be configured for the LU 1 and the LU 2 associated with the same LDEV 10.

According to FIG. 14 and FIG. 15, in the case where the migration destination storage apparatus 1111 (control unit 132B) receives a reserve command in which the LU 1 associated with the LDEV 10 is designated from the host computer 1, if reserve information corresponding to the LU 1 is not configured (registered), the migration destination storage apparatus 1111 registers reserve information meaning that the designated device (LU 1) is reserved by the host computer 1 in the LU management table 211' as the reserve information 704 corresponding to the LU 1. The migration destination storage apparatus 1111 then returns a success response (response meaning that reserve is successful) to the host computer 1 as a response to the reserve command.

Further, in the case where the migration destination storage apparatus 1111 (control unit 132B) receives a reserve command in which the LU 2 associated with the LDEV 10 is designated from the host computer 2, even if the reserve information 1532 is configured for the LU 1 associated with the LDEV 10, if the reserve information is not configured for the LU 2, the migration destination storage apparatus 1111 registers reserve information meaning that the designated device (LU 2) is reserved by the host computer 2 in the LU management table 211' as the reserve information 704 corresponding to the LU 2. The migration destination storage apparatus 1111 then returns a success response to the host computer 2 as a response to the reserve command. That is, in the case where the migration destination storage apparatus 1111 receives a reserve command in which the LU 2 associated with the LDEV 10 is designated from the host computer 2, even if the reserve information 1532 is configured for the LU 1 associated with the LDEV 10, the migration destination storage apparatus 1111 does not have to return a failure response to the host computer 2.

While some embodiments have been described above, these are merely examples for explaining the present invention, and not intended to limit the scope of the present invention only to these embodiments. The present invention can be implemented in other various forms.

For example, processing which is performed by an apparatus according to an instruction from the management computer to the apparatus (for example, a host computer, VM or a storage apparatus) can be expressed such that the management computer causes the apparatus to execute the processing.

Further, for example, in at least one of Embodiments 1 to 4, at least one of the host computer 1, the host computer 2 and the VM 2 may be a host computer or VM which changes processing according to at least part (for example, at least one of the vendor name and the model name) of configuration information (for example, Inquiry information) of the storage apparatus to be recognized.

Further, the processing performed by the host computer may include processing performed by at least one of the VM and the APP.

REFERENCE SIGNS LIST

111: host computer
120: management computer
130A: migration source storage apparatus
130B: migration destination storage apparatus

The invention claimed is:

1. A computer system comprising:
a communication interface that is communicatively coupled to one or more host systems via a first network;
a PDEV port that is communicatively coupled to one or more physical storage devices;
a memory; and
a processor communicatively coupled to the communication interface, the PDEV port and the memory, wherein the processor:
   forms a plurality of logical devices from the one or more physical storage devices,
   determines inquiry information for each respective logical device from the plurality of logical devices, wherein the inquiry information includes at least one of a manufacturer, model and a serial number of a particular physical storage device from which for each respective logical device from the plurality of logical devices is formed,
   forms a plurality of logical units from each respective logical device from the plurality of logical devices,
   stores, for each respective logical unit from the plurality of logical units, inquiry information for the respective logical device in which the respective logical unit is formed,
   provides the plurality of logical units to the one or more host systems,
   receives, using the communication interface, a migration request from the one or more host systems, wherein the migration request specifies a source logical unit and a destination logical unit from the plurality of logical units,
   in response to the migration request, moves, using the PDEV port, data from the source logical unit to the destination logical unit,
   in response to an inquiry request for the inquiry information of the destination logical unit, returns, using the communication interface, the inquiry information of the source logical unit.

2. The computer system according to claim 1, wherein:
a migration source virtual machine is associated with the source logical unit, and
the processor further migrates the migration source virtual machine to a migration destination virtual machine that is associated with the destination logical unit.

3. The computer system according to claim 1, wherein:
the one or more host systems includes a first host system and a second host system,
a first logical storage space is formed from a first logical unit from the plurality of logical units,
a second logical storage space is formed from a second logical unit from the plurality of logical units,
the processor further:
   stops an application program for switching processing of switching logical storage space to be used by the application program to be executed at the first host system from the first logical storage space with which the first logical unit is associated to the second logical storage space with which the second logical unit is associated,
   executes the switching processing, and
   resumes the application program, and
   before the application program is stopped, the second logical unit is associated with a logical device with which the first logical unit is associated.

4. The computer system according to claim 1, wherein the processor further:
receives, using the communication interface, a reserve command from the one or more host systems, wherein the reserve command includes an ID of a device to be reserved and an ID of a transmission source in addition to an Inquiry command, and
in response to the reserve command, manages reserve information for each logical unit in addition to the Inquiry information,
provides a second logical unit from the plurality of logical units to a first host system, wherein a first logical unit is provided to a second host system which is a different host system from the first host system,
associates reserve information including a transmission source ID included in the reserve command with the second logical unit if there is no reserve information regarding the second logical unit, and
returns a success response meaning that reserve for the second logical unit is successful to the first host system as a response to the reserve command.

5. The computer system according to claim 1, wherein the processor further:
receives a reserve command including an ID of a particular logical unit as an ID of a device to be reserved from a first host system from the one or more host systems,
associates reserve information including transmission source ID included in the reserve command with the particular logical unit if there is no reserve information for the logical unit, and
returns a success response meaning that reserve for the particular logical unit is successful to the first host system as a response to the reserve command.

6. A storage control method comprising:
forming a plurality of logical devices from one or more physical storage devices;

determining inquiry information for each respective logical device from the plurality of logical devices, wherein the inquiry information includes at least one of a manufacturer, model and a serial number of a particular physical storage device from which for each respective logical device from the plurality of logical devices is formed:

forming a plurality of logical units from each respective logical device from the plurality of logical devices;

storing, for each respective logical unit from the plurality of logical units, inquiry information for the respective logical device in which the respective logical unit is formed;

providing the plurality of logical units to the one or more host systems;

receiving, a migration request from the one or more host systems, wherein the migration request specifies a source logical unit and a destination logical unit from the plurality of logical units;

in response to the migration request, moving data from the source logical unit to the destination logical unit; and in response to an inquiry request for the inquiry information of the destination logical unit, returning the inquiry information of the source logical unit.

* * * * *